(12) United States Patent
Zhou

(10) Patent No.: US 9,131,587 B2
(45) Date of Patent: Sep. 8, 2015

(54) METHOD FOR MANUFACTURING A FLEXIBLE DISPLAY DEVICE

(71) Applicant: BOE TECHNOLOGY GROUP CO., LTD., Beijing (CN)

(72) Inventor: Weifeng Zhou, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 14/098,800

(22) Filed: Dec. 6, 2013

(65) Prior Publication Data

US 2014/0162522 A1    Jun. 12, 2014

(30) Foreign Application Priority Data

Dec. 11, 2012  (CN) .......................... 2012 1 0533754

(51) Int. Cl.
  *H05B 33/10* (2006.01)
  *G02F 1/1333* (2006.01)

(52) U.S. Cl.
  CPC .......... *H05B 33/10* (2013.01); *G02F 1/133305* (2013.01)

(58) Field of Classification Search
  CPC ..................... H01L 51/003; G02F 1/133305
  USPC .......................................................... 445/24
  See application file for complete search history.

(56) References Cited

U.S. PATENT DOCUMENTS

| 7,453,533 B2 | 11/2008 | Lee et al. | |
| 8,773,625 B2 | 7/2014 | Li et al. | |
| 2006/0222971 A1 | 10/2006 | Seo et al. | |
| 2009/0014746 A1* | 1/2009 | Ramirez et al. | 257/99 |
| 2009/0101928 A1* | 4/2009 | Kim et al. | 257/98 |
| 2010/0124635 A1 | 5/2010 | Kim et al. | |
| 2012/0052214 A1 | 3/2012 | Tsai et al. | |
| 2012/0164408 A1* | 6/2012 | Hwu et al. | 428/202 |
| 2013/0011969 A1* | 1/2013 | Chen et al. | 438/111 |
| 2014/0050933 A1 | 2/2014 | Kim et al. | |

FOREIGN PATENT DOCUMENTS

| CN | 1746733 A | 3/2006 |
| CN | 102082150 A | 6/2011 |
| CN | 102496599 A | 6/2012 |
| CN | 102637575 A | 8/2012 |

OTHER PUBLICATIONS

Extended European Search Report Dated Apr. 23, 2014, Application No. 13196494.2—1904, Applicant Boe Technology Group Co. Ltd., 6 Pages.
Chinese Office Action Dated Nov. 27, 2014, Application No. 201210533754.4, 8 Pages.

* cited by examiner

*Primary Examiner* — Thomas A Hollweg
*Assistant Examiner* — Jacob R Stern
(74) *Attorney, Agent, or Firm* — Brooks Kushman P.C.

(57) ABSTRACT

The present invention relates to the display technology field and provides a method for manufacturing a flexible display device, wherein an adhesion layer having a rough surface is formed at the juncture of a releasing layer and a carrier substrate before a flexible substrate is formed on the carrier substrate. The technical solution of the present invention can improve the qualified rate of the flexible display device.

19 Claims, 8 Drawing Sheets

METHOD FOR MANUFACTURING A FLEXIBLE DISPLAY DEVICE

CROSS-REFERENCE TO RELATED APPLICATIONS

This application claims priority to Chinese application No. 201210533754.4, filed Dec. 11, 2012, which is hereby incorporated by reference in its entirety.

TECHNICAL FIELD

The present invention relates to the display technology field, and specially relates to a method for manufacturing a flexible display device.

BACKGROUND

Flexible display technology has been developed rapidly in the recent decade and as a result, the flexible display device advances greatly from the size of the screen to the display quality. Flexible display device, also known as rollable display, is a rollable and deformable display apparatus which comprises a visible flexible panel made of flexible materials. Both the CRT which could almost be on the brink of disappearance and the current mainstream LCD substantially belong to the traditional rigid display. Compared with the regular rigid display, the flexible display device has many merits, such as impact resistance, better anti-knock ability; small weight and volume, more convenient to carry; employing tape technology which is similar to the newspaper print technology, and lower cost. Depending on its rollable characteristic, the flexible display device is competent for all the fields wherein the traditional display device is applied and other many fields requiring a curved surface display device, such as a smart card, an electronic paper, a smart tag and, and the flexible display device shall occupy a huge share in the future display product market, thanks to its outstanding properties.

The existing method for manufacturing a flexible display device generally comprises: a step of forming a releasing layer on a carrier substrate, a step of forming a flexible substrate on the releasing layer, and a step of fabricating a display device on the flexible substrate, wherein the flexible substrate is generally formed by applying liquid polyimide on the carrier substrate. The common solvents for the liquid polyimide such as 1-methyl-2-pyrrolidone, butyl cellosolve, etc., are relatively weak in infiltration on the glass carrier substrate, which easily causes holiday of the liquid polyimide on the surface of the glass carrier substrate. The holiday of the liquid polyimide at the juncture of the glass carrier substrate and the releasing layer leads to defects of the polyimide membrane substrate such as warp, bubble and peeled off undesirably during the fabricating of the flexible display device, and therefore will reduce qualified rate of the flexible display device.

SUMMARY

The technical problem solved by the invention is to provide a manufacturing method for the flexible display device that can raise qualified rate of the flexible display device.

To solve the technical problem mentioned above, the examples of the present invention provide solutions as follows.

In the first aspect, the present invention provides a method for manufacturing a flexible display device, wherein an adhesion layer having a rough surface is formed at the juncture of a releasing layer and a carrier substrate, before a flexible substrate is formed on the carrier substrate.

Furthermore, in the above mentioned solution, the method specifically comprises
  providing the carrier substrate;
  forming the releasing layer on the carrier substrate;
  forming the adhesion layer at the juncture of the releasing layer and the carrier substrate;
  forming the flexible substrate on the carrier substrate on which the adhesion layer is formed; and
  fabricating a display device on the flexible substrate.

Furthermore, in the above mentioned solution, the method specifically comprises
  providing the carrier substrate;
  forming the adhesion layer having a hollow area on the carrier substrate;
  forming the releasing layer in the hollow area of the adhesion layer;
  forming the flexible substrate on the carrier substrate on which the adhesion layer is formed;
  fabricating a display device on the flexible substrate.

Furthermore, in the above mentioned solution, the method specifically comprises
  providing the carrier substrate;
  forming the adhesion layer on the carrier substrate;
  forming the releasing layer on the adhesion layer;
  forming the flexible substrate on the carrier substrate on which the adhesion layer is formed; and
  fabricating a display device on the flexible substrate.

Furthermore, in the above mentioned solution, the releasing layer covers part of the adhesion layer, and uncovered adhesion layer by the releasing layer is remained around the releasing layer.

Furthermore, in the above mentioned solution, the adhesion layer is formed of a metal oxide which is one or more selected from indium tin oxide, indium zinc oxide, aluminum zinc oxide and indium gallium zinc oxide.

Furthermore, in the above mentioned solution, the adhesion layer is formed of organic material, and a surface of the adhesion layer has a concave-convex pattern.

Furthermore, in the above mentioned solution, the flexible substrate is formed of polyimide.

Furthermore, in the above mentioned solution, the material of the releasing layer comprises one or more selected from parylene and derivatives thereof, polytetrafluoroethylene and derivatives thereof, and Zeonor.

Furthermore, in the above mentioned solution, the carrier substrate is selected from a glass substrate, a metal substrate, a quartz substrate and an organic substrate.

The examples of the present invention have the following advantages.

In the above mentioned solution, the adhesion layer having a rough surface is firstly formed at the juncture of the releasing layer and the carrier substrate, which has great adhesion to both the carrier substrate and the flexible substrate. Then the flexible substrate is formed on the carrier substrate. Because of the adhesion layer, when forming the flexible substrate layer, the liquid polyimide is well adhered at the area other than the releasing layer, thereby avoiding the holiday defect caused by poor infiltration of the polyimide on the base substrate at the area other than the releasing layer. Furthermore, the defects of the polyimide membrane substrate such as warp, bubble and peeled off undesirably are avoided during the fabricating of the flexible display device, and therefore the qualified rate of the flexible display device is improved.

The present invention will be more clearly understood from the description of preferred embodiments as set forth below, with reference to the accompanying drawings.

REFERENCE SYMBOLS

Figure 1:
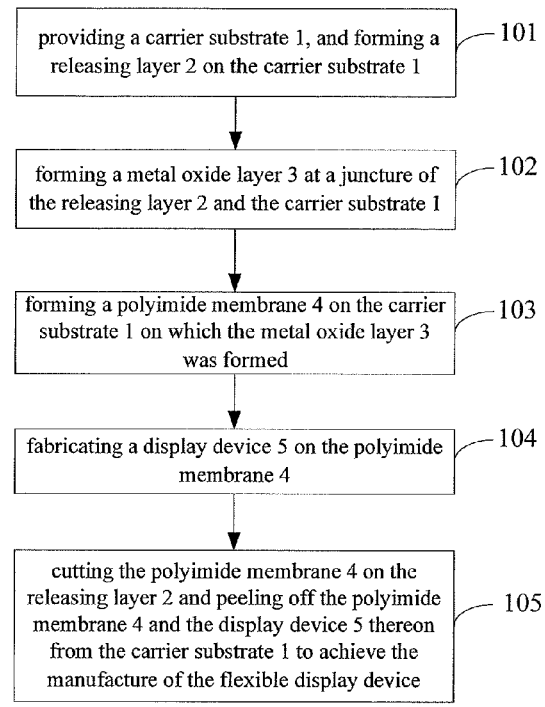
FIG. 1 is the flow diagram of the method for manufacturing the flexible display device of the example 1 of the present invention.

1: a carrier substrate; 2 a releasing layer; 3 a metal oxide layer; 4 a polyimide membrane; 5: a display device.

DETAILED DESCRIPTION

As required, detailed embodiments are disclosed herein. However, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

In order to describe clearly the technical problem intended to solve, the technical solution and the advantages of the present invention, the specific description is provided below with reference to the drawings.

The examples of present invention aim at the problem that holiday of the liquid polyimide may occur at the juncture of the glass carrier substrate and the releasing layer in the prior art, which will lead to the defects of the polyimide membrane substrate such as warp, bubble and peeled off undesirably during the fabricating of the flexible display device and therefore will reduce qualified rate of the flexible display device. Thus, the examples of present invention provide a method for manufacturing the flexible display device that can improve the qualified rate of the flexible display device.

The examples of the present invention provide a method for manufacturing a flexible display device, wherein an adhesion layer having a rough surface is formed at the juncture of a releasing layer and a carrier substrate, before a flexible substrate is formed on the carrier substrate.

Furthermore, in the above mentioned solution, the method specifically comprises
  providing the carrier substrate;
  forming the releasing layer on the carrier substrate;
  forming the adhesion layer at the juncture of the releasing layer and the carrier substrate;
  forming the flexible substrate on the carrier substrate on which the adhesion layer is formed; and
  fabricating a display device on the flexible substrate.

Furthermore, in the above mentioned solution, the method specifically comprises
  providing the carrier substrate;
  forming the adhesion layer having a hollow area on the carrier substrate;
  forming the releasing layer in the hollow area of the adhesion layer;
  forming the flexible substrate on the carrier substrate on which the adhesion layer is formed; and
  fabricating a display device on the flexible substrate.

Furthermore, in the above mentioned solution, the method specifically comprises
  providing the carrier substrate;
  forming the adhesion layer on the carrier substrate;
  forming the releasing layer on the adhesion layer;
  forming the flexible substrate on the carrier substrate on which the adhesion layer is formed; and
  fabricating a display device on the flexible substrate.

Furthermore, in the above mentioned solution, the adhesion layer is formed by a metal oxide, which is selected from one or more of indium tin oxide (ITO), indium zinc oxide (IZO), aluminum zinc oxide (ZAO) and indium gallium zinc oxide (IGZO).

Furthermore, in the above mentioned solution, the adhesion layer is formed of organic material, and a surface of the adhesion layer has a concave-convex pattern.

Furthermore, in the above mentioned solution, the flexible substrate is formed of polyimide.

Furthermore, in the above mentioned solution, the material of the releasing layer comprises one or more selected from parylene and derivatives thereof, polytetrafluoroethylene and derivatives thereof and Zeonor.

Furthermore, in the above mentioned solution, the carrier substrate is selected from a glass substrate, a metal substrate, a quartz substrate or an organic substrate.

As to the method for manufacturing the flexible display device of the present invention, the adhesion layer having a rough surface is firstly formed at the juncture of the releasing layer and the carrier substrate, which has great adhesion to both the carrier substrate and the flexible substrate. Then the flexible substrate is formed on the carrier substrate. Because of the adhesion layer, when forming the flexible substrate layer, the liquid polyimide is well adhered at the area other than the releasing layer, thereby avoiding the holiday defect caused by poor infiltration between the liquid polyimide and the area of the base substrate other than the releasing layer. Furthermore, the defects of the polyimide flexible substrate such as warp, bubble and peeled off undesirably during the fabricating of the flexible display device, are avoided and the qualified rate of the flexible display device is improved.

The method for manufacturing the flexible display device will be described in details with reference to drawings and specific examples.

The First Example

As can be seen from FIG. 1, the method for manufacturing the flexible display device of the present example comprised Steps 101-105.

Figure 2A:
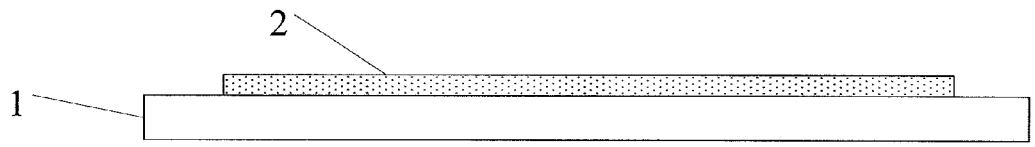
FIG. 2a is the cross-sectional diagram after the releasing layer has been formed on the carrier substrate in the example 1 of the present invention.
Figure 2B:
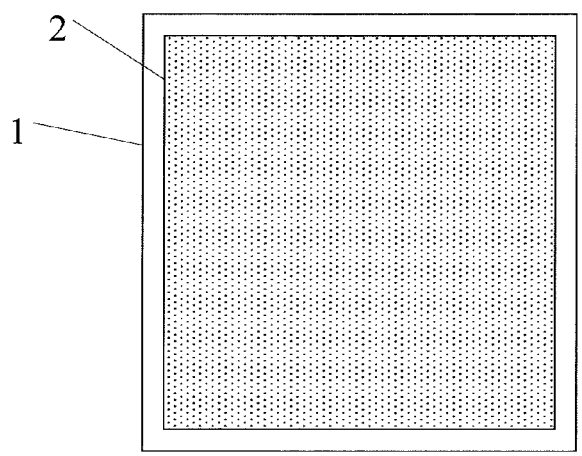
FIG. 2b is the plan diagram after the releasing layer has been formed on the carrier substrate in the example 1 of the present invention.

The Step 101: providing a carrier substrate 1, and forming a releasing layer 2 on the carrier substrate 1.

Wherein the structure formed after step 101 was shown in FIGS. 2a and 2b, the carrier substrate 1 could be a glass substrate, a metal substrate, a quartz substrate or an organic substrate.

Wherein the material of the releasing layer 2 could be one or more selected from parylene and derivatives thereof, polytetrafluoroethylene and derivatives thereof, and Zeonor (Product name, purchased from Zeon Corporation).

The Step 102: forming a metal oxide layer 3 at the juncture of the releasing layer 2 and the carrier substrate 1.

Figure 3A:
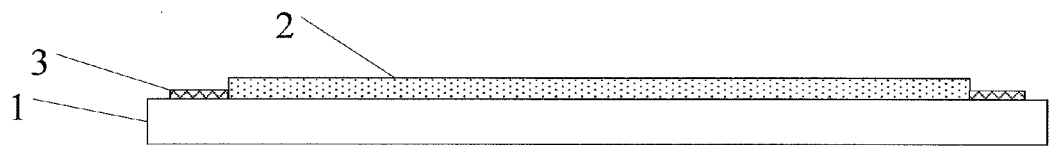
FIG. 3a is the cross-sectional diagram after the metal oxide layer has been formed around the periphery of the releasing layer in the example 1 of the present invention.
Figure 3B:
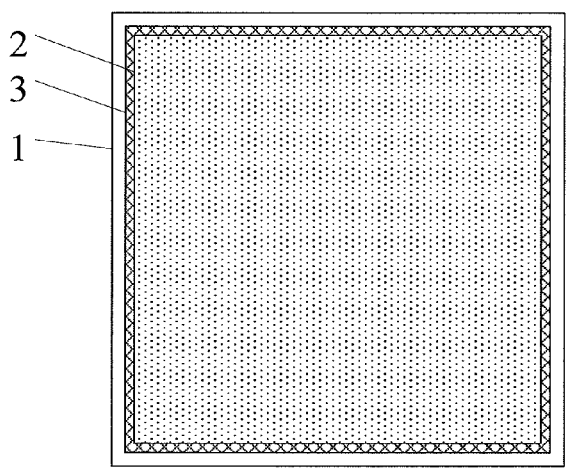
FIG. 3b is the plan diagram after the metal oxide layer has been formed around the periphery of the releasing layer in the example 1 of the present invention.

Wherein, as shown in FIGS. 3a and 3b, a metal oxide layer 3 was formed at the juncture of the releasing layer 2 and the carrier substrate 1; the adhesion layer formed of metal oxide, by utilizing microscopic surface roughness of the metal oxide, can enhance the adhesion between of the flexible substrate (for example, polyimide membrane) and the carrier substrate, which reduced the occurrence of the defects of the polyimide membrane substrate, such as warp, bubble and peeled off undesirably during the fabricating of the flexible display device.

In the present example, the adhesion layer formed of the metal oxide was used as an example to illustrate, and furthermore, the metal oxide can be one or more of indium tin oxide (ITO), indium zinc oxide (IZO), aluminum zinc oxide (AZO) and indium gallium zinc oxide (IGZO).

Moreover, the adhesion layer can be an organic material layer, and the surface of the adhesion layer has a concave-convex pattern. The organic material layer having a concave-convex pattern in its surface can be similar to the black matrix of the color filter or the pattern formed of color photoresist, etc. The adhesion layer is characterized in that adhesion to both the carrier substrate and the polyimide is strong. Thus materials having such characteristic can be used to form the adhesion layer.

The Step 103: forming a polyimide membrane 4 on the carrier substrate 1 on which the metal oxide layer 3 was formed.

Figure 4A:
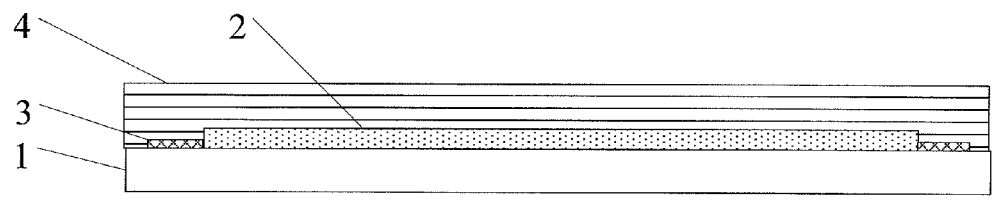
FIG. 4a is the cross-sectional diagram after the polyimide membrane has been formed on the carrier substrate in example 1 of the present invention.
Figure 4B:
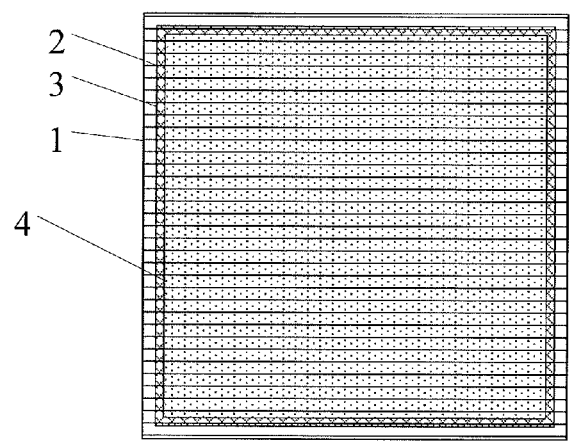
FIG. 4b is the plan diagram after the polyimide membrane has been formed on the carrier substrate in example 1 of the present invention.

The present example is illustrated with the flexible substrate formed of polyimide. As shown in FIGS. 4a and 4b, liquid polyimide was applied to the whole carrier substrate 1, wherein the liquid polyimide covered the whole releasing layer 2 and covered part or the entire metal oxide layer 3 around the releasing layer 2. Then a polyimide membrane 4 having a thickness of 5~150 μm was formed through a series of steps including drying at a low pressure, prebaking and curing at a high temperature.

The Step 104: fabricating a display device 5 on the polyimide membrane 4.

Figure 5A:
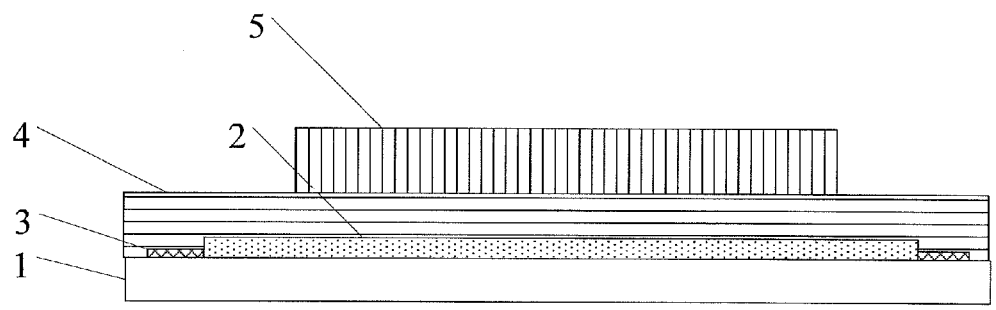
FIG. 5a is the cross-sectional diagram after the display device has been fabricated on the carrier substrate.
Figure 5B:
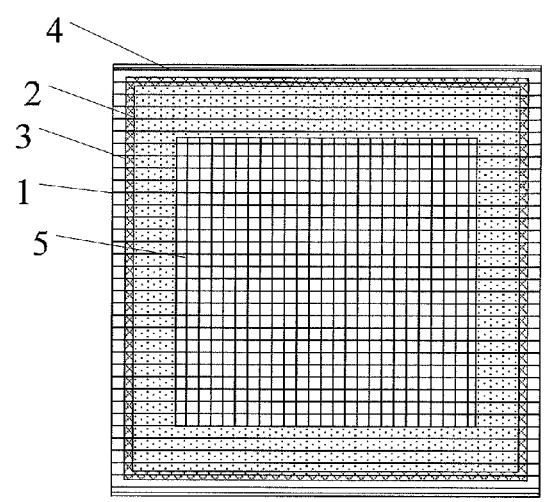
FIG. 5b is the plan diagram after the display device has been fabricated on the carrier substrate.

As shown in FIGS. 5a and 5b, an isolation layer for water and oxygen and a display device were fabricated on the polyimide membrane 4.

The Step 105: cutting the polyimide membrane 4 on the releasing layer 2 and peeling off the polyimide membrane 4 and the display device 5 thereon from the carrier substrate 1 to achieve the manufacture of the flexible display device.

Figure 6A:
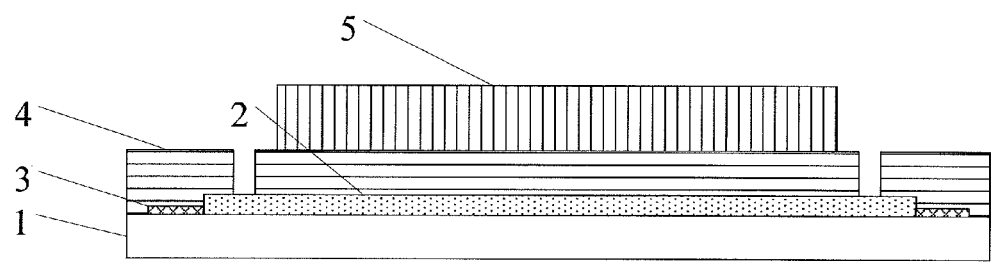
FIG. 6a is the cross-sectional diagram of cutting the polyimide membrane after the display device has been fabricated on the carrier substrate in example 1 of the present invention.
Figure 6B:
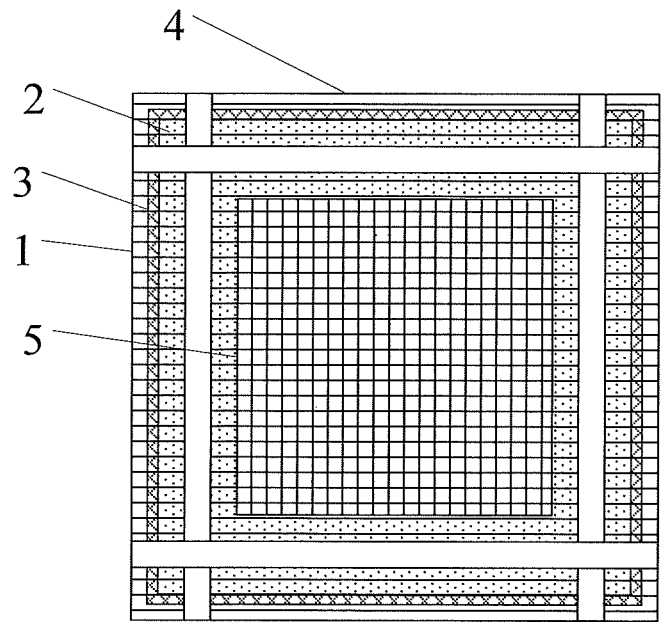
FIG. 6b is the plan diagram of cutting the polyimide membrane after the display device has been fabricated on the carrier substrate in example 1 of the present invention.

As shown in FIGS. 6a and 6b, the polyimide membrane 4 was cut on the releasing layer 2 and then the releasing layer 2 can be removed by chemical reaction or radiation of ultraviolet rays. The polyimide membrane 4 and the display device 5 thereon were peeled off from the carrier substrate 1, or the polyimide membrane 4 and the display device 5 thereon were peeled off from the carrier substrate 1 by mechanical force directly, to achieve the manufacture of the flexible display device.

The metal oxide layer was formed at the juncture of the releasing layer and the carrier substrate in the present example, thereby achieving strong bonding between the polyimide membrane around the carrier substrate and the carrier substrate by using metal oxide as a transition, while the adhesion of the polyimide membrane to the releasing layer in the middle area of the carrier substrate is very low. Therefore, the good adhesion between the polyimide membrane and the carrier substrate was achieved during fabricating the display device, thereby improving the holiday defect caused by poor infiltration between the liquid polyimide and the area of the base substrate other than the releasing layer, improving the defects of the polyimide membrane substrate, such as warp, bubble and peeled off undesirably during fabricating the flexible display device and therefore increasing the qualified rate of the flexible display device. After the display device has been manufactured, the polyimide membrane and the display device thereon can be easily removed by cutting the polyimide membrane on the releasing layer to achieve the manufacture of the flexible display device.

The flexible display device manufactured by the present example can be a product or parts having the display ability, such as a liquid crystal display (LCD), an organic light-emitting diode display (OLED), a quantum dot LED (QLED), an electronic paper display (EPD), a touch panel, a photovoltaic battery and a radio frequency identification (RFID).

The Second Example

Figure 7:
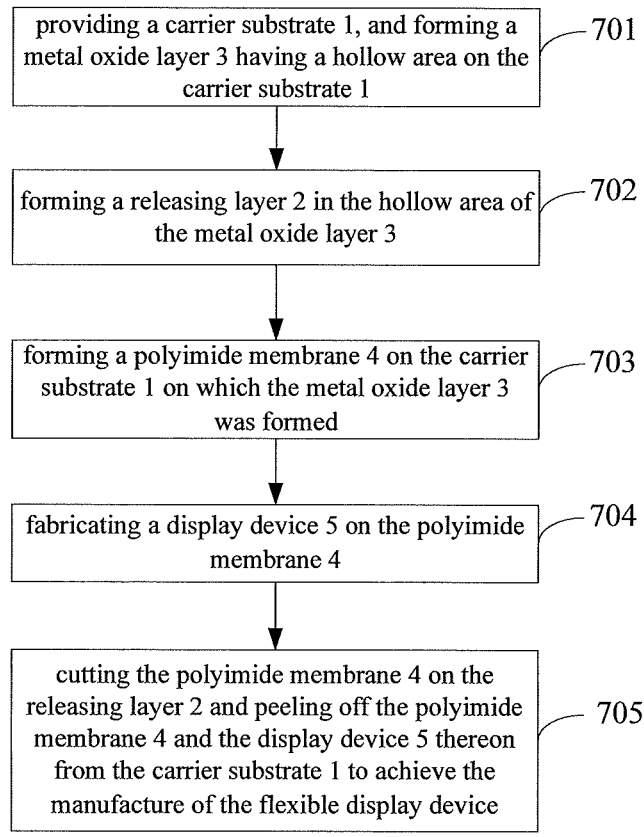
FIG. 7 is a flow diagram of the method for manufacturing the flexible display device of the example 2 of the present invention.

As can be seen from FIG. 7, the method for manufacturing the flexible display device of the present example comprises Step 701-Step 705.

The Step 701: providing a carrier substrate 1, and forming a metal oxide layer 3 having a hollow area on the carrier substrate 1.

Figure 8A:
FIG. 8a is the cross-sectional diagram after the metal oxide layer has been firstly formed on the carrier substrate around the periphery of the releasing layer in the example 2 of the present invention.
Figure 8B:
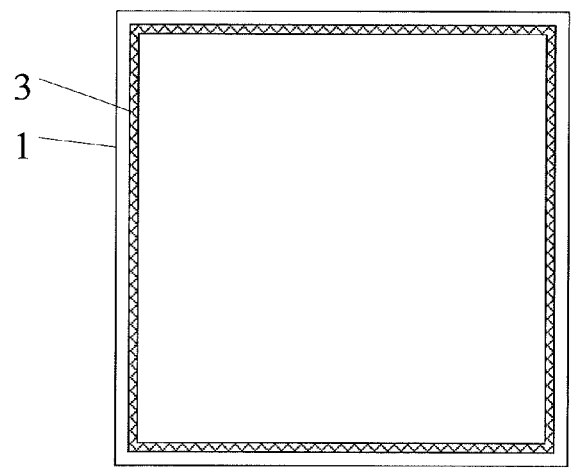
FIG. 8b is the plan diagram after the metal oxide layer has been firstly formed on the carrier substrate around the periphery of the releasing layer in the example 2 of the present invention.

The structure formed after the step 701 is shown in FIGS. 8a and 8b, wherein the carrier substrate 1 can be a glass substrate, a metal substrate, a quartz substrate or an organic substrate.

A metal oxide layer 3 having a hollow area was formed on the carrier substrate 1, wherein the hollow area was not limited to rectangle, and more specifically, the size of the hollow area can match with the size of the releasing layer to be formed. In this example, the metal oxide layer as the adhesion layer, by utilizing microscopic surface roughness of the metal oxide, can enhance the adhesion between the flexible substrate (for example, the polyimide membrane) and the carrier substrate, which reduced occurrence of the defects of the polyimide membrane substrate, such as warp, bubble and peeled off during the fabricating of the flexible display device.

In the present example, the adhesion layer formed of the metal oxide layer was used as an example to illustrate, and furthermore, the metal oxide could be one or more of indium tin oxide (ITO), indium zinc oxide (IZO), aluminum zinc oxide (AZO) and indium gallium zinc oxide (IGZO).

Moreover, the adhesion layer can be an organic material layer, the surface of which has a concave-convex pattern. The organic material layer having a concave-convex pattern in its surface is similar to the black matrix of the color filter or the pattern of color photoresist, etc. The adhesion layer is characterized by that adhesion to both the carrier layer and the polyimide layer is strong. All materials having such characteristic can be used to form the adhesion layer.

The Step 702: forming a releasing layer 2 in the hollow area of the metal oxide layer 3.

Wherein the whole hollow area was filled up with the releasing layer 2. Moreover, the releasing layer 2 can cover part of the metal oxide layer 3 but not all of it. Uncovered metal oxide layer 3 was remained around the periphery of the releasing layer 2. The structure formed after the step 702 was shown in FIGS. 3a and 3b.

The Step 703: forming a polyimide membrane 4 on the carrier substrate 1 on which the metal oxide layer 3 was formed.

The present example is illustrated with the polyimide membrane as the flexible substrate. As shown in FIGS. 4a and 4b, the liquid polyimide was applied to the whole carrier substrate 1, wherein the liquid polyimide covered the whole releasing layer 2 and covered part or the entire metal oxide layer 3 around the releasing layer 2. Then the polyimide membrane having a thickness of 5~150 μm was formed through a series of steps including drying at a low pressure, prebaking and curing at a high temperature.

The Step 704: fabricating a display device 5 on the polyimide membrane 4.

As shown in FIGS. 5a and 5b, an isolation layer for water and oxygen and the display device 5 were fabricated on the polyimide membrane 4.

The Step 705: cutting the polyimide membrane 4 on the releasing layer 2 and peeling off the polyimide membrane 4 and the display device 5 thereon from the carrier substrate 1 to achieve the manufacture of the flexible display device.

As shown in FIGS. 6a and 6b, the polyimide membrane was cut on the releasing layer 2 and then the releasing layer 2 can be removed by chemical reaction or radiation of ultraviolet rays. The polyimide membrane 4 and the display device 5 thereon were peeled off from the carrier substrate 1, or the polyimide membrane 4 and the display device 5 thereon were peeled off from the carrier substrate 1 by mechanical force directly, to achieve the manufacture of the flexible display device.

The metal oxide layer was formed at the juncture of the releasing layer and the carrier substrate in the present example, thereby achieving strong bonding between the polyimie membrane and the carrier substrate by using metal oxide as a transition, while the adhesion of polyimide membrane to the releasing layer in the middle of the carrier substrate is very low. Therefore, the good adhesion between the polyimide membrane and the carrier substrate was achieved during fabricating the display device, thereby improving the holiday defect caused by poor infiltration between the liquid polyimide and the area of the base substrate other than the releasing layer, such as warp, bubble and peeled off undesirably during fabricating the flexible display device and therefore increasing the qualified rate of the flexible display device. After the display device has been manufactured, the polyimide membrane and the display device thereon can be easily removed by cutting the polyimide membrane on the releasing layer to achieve the manufacture of the flexible display device.

The flexible display device manufactured by the present example can be a product or parts having display ability, such as a liquid crystal display (LCD), an organic light-emitting a diode display (OLED), a quantum dot LED (QLED), an electronic paper display (EPD), a touch panel, a photovoltaic battery and a radio frequency Identification (RFID).

The Third Example

Figure 9:
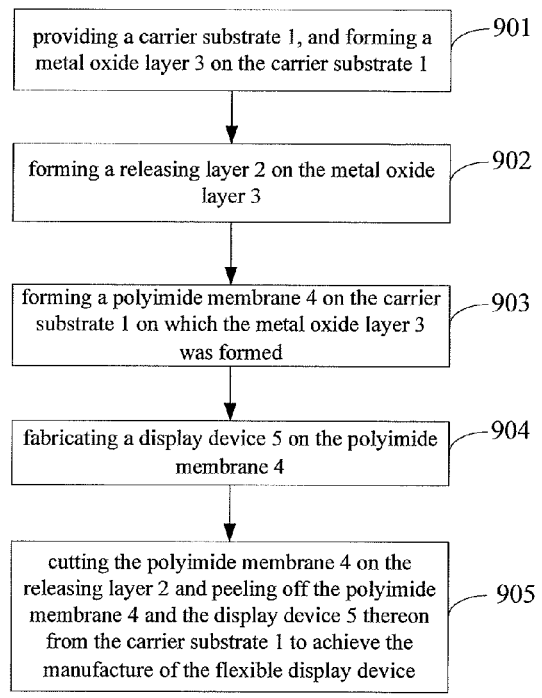
FIG. 9 is the flow diagram of the method for manufacturing the flexible display device of the example 3 of the present invention.

As can be seen from FIG. 9, the method for manufacturing the flexible display device of the present example comprises Step 901-Step 905.

The Step 901: providing a carrier substrate 1, and forming a metal oxide layer 3 on the carrier substrate 1.

Figure 10A:
FIG. 10a is the cross-sectional diagram after the metal oxide layer has been entirely formed on the carrier substrate in the example 3 of the present invention.
Figure 10B:
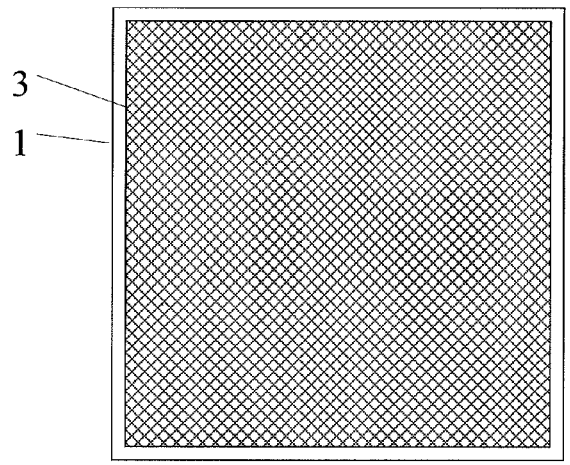
FIG. 10b is the plan diagram after the metal oxide layer has been entirely formed on the carrier substrate in the example 3 of the present invention.

The structure formed after the Step 901 was shown in FIGS. 10a and 10b, wherein the carrier substrate 1 could be a glass substrate, a metal substrate, a quartz substrate or an organic substrate.

In the present example, a metal oxide layer was firstly formed entirely on the carrier substrate 1. The adhesion layer formed of metal oxide, by utilizing microscopic surface roughness of the metal oxide, can enhance the adhesion between of the flexible substrate (for example, polyimide membrane) and the carrier substrate, which reduced the occurrence of the defects of the polyimide membrane substrate, such as warp, bubble and peeled off undesirably during the fabricating of the flexible display device.

In the present example, the adhesion layer formed of the metal oxide was used as an example to illustrate, and furthermore, the metal oxide can be one or more of indium tin oxide (ITO), indium zinc oxide (IZO), aluminum zinc oxide (AZO) and indium gallium zinc oxide (IGZO).

Moreover, the adhesion layer can be an organic material layer, and the surface of the adhesion layer has a concave-convex pattern. The organic material layer having a concave-convex pattern in its surface can be similar to the black matrix of the color filter, the pattern formed of color photoresist, etc. The adhesion layer is characterized in that the adhesion to both the carrier layer and the polyimide layer is strong. Thus all materials having such characteristic can be used to form the adhesion layer.

The Step 902: forming a releasing layer 2 on the metal oxide layer 3.

Figure 11A:
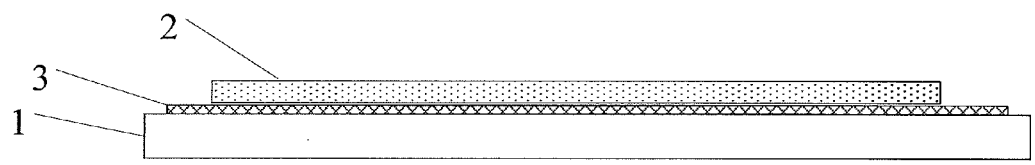
FIG. 11a is the cross-sectional diagram after the releasing layer has been formed on the metal oxide layer in example 3 of the present invention.
Figure 11B:
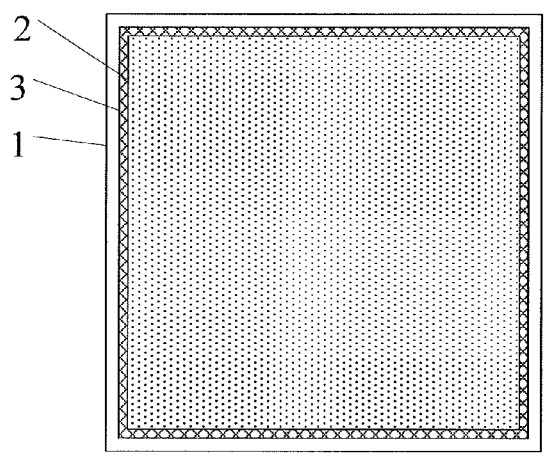
FIG. 11b is the plan diagram after the releasing layer has been formed on the metal oxide layer in example 3 of the present invention.

As shown by FIGS. 11a and 11b, the releasing layer 2 covered partly the metal oxide layer 3 and the uncovered metal oxide layer 3 was remained around the periphery of the releasing layer 2.

The Step 903: forming a polyimide membrane 4 on the carrier substrate 1 on which the metal oxide layer 3 was formed.

The present example was illustrated with the flexible substrate formed of polyimide. Liquid polyimide was applied to the whole carrier substrate 1, wherein the liquid polyimide covered the whole releasing layer 2 and covered part or the entire metal oxide layer 3 around the releasing layer 2. Then the polyimide membrane 4 having a thickness of 5~150 μm was formed through a series of steps including drying at a low pressure, prebaking and curing at a high temperature.

The Step 904: fabricating a display device 5 on the polyimide membrane 4.

An isolation layer for water and oxygen and a display device were fabricated on the polyimide membrane 4.

The Step 905: cutting the polyimide membrane 4 on the releasing layer 2 and peeling off the polyimide membrane 4 and the display device 5 thereon from the carrier substrate 1 to achieve the manufacture of the flexible display device.

The polyimide membrane 4 was cut on the releasing layer 2 and then the releasing layer 2 could be removed by chemical reaction or radiation of ultraviolet rays. The polyimide membrane 4 and the display device 5 thereon were peeled off from the carrier substrate 1, or the polyimide membrane 4 and the display device 5 thereon were peeled off from the carrier substrate 1 by mechanical force directly, to achieve the manufacture of the flexible display device.

The metal oxide layer was formed at the juncture of the releasing layer and the carrier substrate in the present example, thereby achieving strong bonding between the polyimide membrane around the carrier substrate and the carrier substrate by using metal oxide as a transition, while the adhesion of the polyimide membrane to the releasing layer in the middle area of the carrier substrate is very low. Therefore, the good adhesion between the polyimide membrane and the carrier substrate was achieved during fabricating the display device, thereby improving the holiday defect caused by poor infiltration between the liquid polyimide and the area of the base substrate other than the releasing layer, improving the defects of the polyimide membrane substrate, such as warp, bubble and peeled off undesirably during fabricating the flexible display device and therefore increasing the qualified rate of the flexible display device. After the display device has been manufactured, the polyimide membrane and the display device thereon can be easily removed by cutting the polyimide membrane on the releasing layer to achieve the manufacture of the flexible display device.

The flexible display device manufactured by the present example can be a product or parts having display ability, such as a liquid crystal display (LCD), an organic light-emitting diode display (OLED), a quantum dot LED (QLED), an electronic paper display (EPD), a touch panel, a photovoltaic battery and a radio frequency Identification (RFID).

Disclosed above are the preferred examples of the present invention. It should be understood that a person skilled in the art can make improvement and modification without deviating from the theory of the present invention, which should also be considered as being within the scope of the present invention.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for manufacturing a flexible display device, wherein an adhesion layer having a rough surface is formed at a juncture of a releasing layer and a carrier substrate before a flexible substrate is formed on the carrier substrate, the method comprising:
    providing the carrier substrate;
    forming the adhesion layer on the carrier substrate;
    forming the releasing layer on the adhesion layer, wherein the releasing layer covers a portion of the adhesion layer and an uncovered portion of the adhesion layer remains around the releasing layer;
    forming the flexible substrate on the carrier substrate on which the adhesion layer is formed;
    fabricating a display device on the flexible substrate; and
    cutting the flexible substrate about the display, removing the releasing layer, and removing the flexible substrate and display from the carrier substrate.

2. The method for manufacturing the flexible display device according to claim 1, wherein the adhesion layer is formed of a metal oxide, which is at least one selected from indium tin oxide, indium zinc oxide, aluminum zinc oxide and indium gallium zinc oxide.

3. The method for manufacturing the flexible display device according to claim 1, wherein the adhesion layer is formed of organic material.

4. The method for manufacturing the flexible display device according to claim 1, wherein the flexible substrate is formed of polyimide.

5. The method for manufacturing the flexible display device according to claim 1, wherein material of the releasing layer comprises at least one selected from parylene and derivatives thereof, polytetrafluoroethylene and derivatives thereof, and Zeonor.

6. The method for manufacturing the flexible display device according to claim 1, wherein the carrier substrate is selected from a glass substrate, a metal substrate, a quartz substrate and an organic substrate.

7. A method of manufacturing a flexible display device, the method comprising:
    providing a carrier substrate;
    disposing an adhesion layer on the carrier substrate;
    disposing a releasing layer on the adhesion layer;
    disposing a flexible substrate on the releasing layer;
    fabricating a display device on the flexible substrate; and
    cutting the flexible substrate about the display, removing the releasing layer, and removing the flexible substrate and display from the carrier substrate.

8. The method of claim 7, wherein the releasing layer has a periphery and covers a first portion of the adhesion layer and does not cover a second portion of the adhesion layer, wherein the second portion extends about the periphery of the releasing layer.

9. The method of claim 7, wherein the adhesion layer comprises a rough adhesive surface.

10. The method of claim 7, wherein the adhesion layer comprises a metal oxide.

11. The method of claim 10, wherein the metal oxide is indium tin oxide, indium zinc oxide, aluminum zinc oxide or indium gallium zinc oxide.

12. The method of claim 7, wherein the adhesion layer comprises an organic material.

13. The method of claim 7, wherein the flexible substrate comprises polyimide.

14. The method of claim 7, wherein the releasing layer comprises parylene, polytetrafluoroethylene, or Zeonor.

15. The method of claim 7, wherein the carrier substrate comprises glass, metal, quartz, or an organic material.

16. A method of manufacturing a flexible display, the method comprising:
    providing a carrier substrate;
    forming an adhesion layer on the carrier substrate, the adhesion layer having a central portion and a peripheral portion;
    forming a releasing layer on the central portion of the adhesion layer with the peripheral portion being uncovered by the releasing layer;
    forming a flexible substrate on the releasing layer and the peripheral portion;
    fabricating a display on the flexible substrate; and
    cutting the flexible substrate about the display, removing the releasing layer, and removing the flexible substrate and display from the carrier substrate.

17. The method of claim 16, wherein the flexible substrate covers the entirety of the peripheral portion.

18. The method of claim 16, wherein the adhesion layer comprises a rough adhesive surface.

19. The method of claim 16, wherein the adhesion layer comprises a metal oxide.

* * * * *